United States Patent [19]

Kindell

[11] 4,408,271

[45] * Oct. 4, 1983

[54] CIRCUIT FOR IMPLEMENTING A DIGITAL COMPUTER INSTRUCTION

[75] Inventor: Jerry L. Kindell, Glendale, Ariz.

[73] Assignee: Honeywell Information Systems Inc., Phoenix, Ariz.

[ * ] Notice: The portion of the term of this patent subsequent to Feb. 10, 1998 has been disclaimed.

[21] Appl. No.: 219,196

[22] Filed: Dec. 22, 1980

Related U.S. Application Data

[63] Continuation-in-part of Ser. No. 328, Jan. 2, 1979, abandoned.

[51] Int. Cl.³ .......................... G06F 5/00; G06F 3/00
[52] U.S. Cl. .............................. 364/200; 340/347 DD
[58] Field of Search ... 364/200 MS File, 900 MS File; 340/347 DD

[56] References Cited

U.S. PATENT DOCUMENTS

| | | | |
|---|---|---|---|
| 3,348,207 | 10/1967 | Malcolm et al. | 364/200 |
| 3,573,744 | 4/1971 | Rigazio | 364/200 |
| 3,638,195 | 1/1972 | Brender et al. | 364/200 |
| 4,000,487 | 12/1976 | Patterson et al. | 364/200 |
| 4,131,940 | 12/1978 | Moyer | 364/200 |
| 4,250,548 | 2/1981 | Kindell | 364/200 |
| 4,291,370 | 9/1981 | Charles | 364/200 |
| 4,364,025 | 12/1982 | Dalton | 340/347 DD |

Primary Examiner—Mark E. Nusbaum
Assistant Examiner—Gary V. Harkcom
Attorney, Agent, or Firm—Edward W. Hughes; William W. Holloway, Jr.; L. J. Marhoefer

[57] ABSTRACT

Apparatus for implementing a single computer instruction for moving a binary number of from one to four characters, with the characters of a given binary number having either eight or nine bits per character, from storage in a word addressable memory to a designated addressable register. The characters of the binary number are stored in the word addressable memory with each word of memory being divided into four 9-bit bytes. The most significant character of the binary number can be stored in any designated byte position of a word location with the characters of the number stored in contiguous byte locations in descending order of significance. The apparatus causes the binary number to be stored in the designated addressable register with the binary number being right justified in that register. Higher order bit positions of the register not needed to store the bits of the binary number will have stored into them fill bits or the sign bit of the number.

5 Claims, 20 Drawing Figures

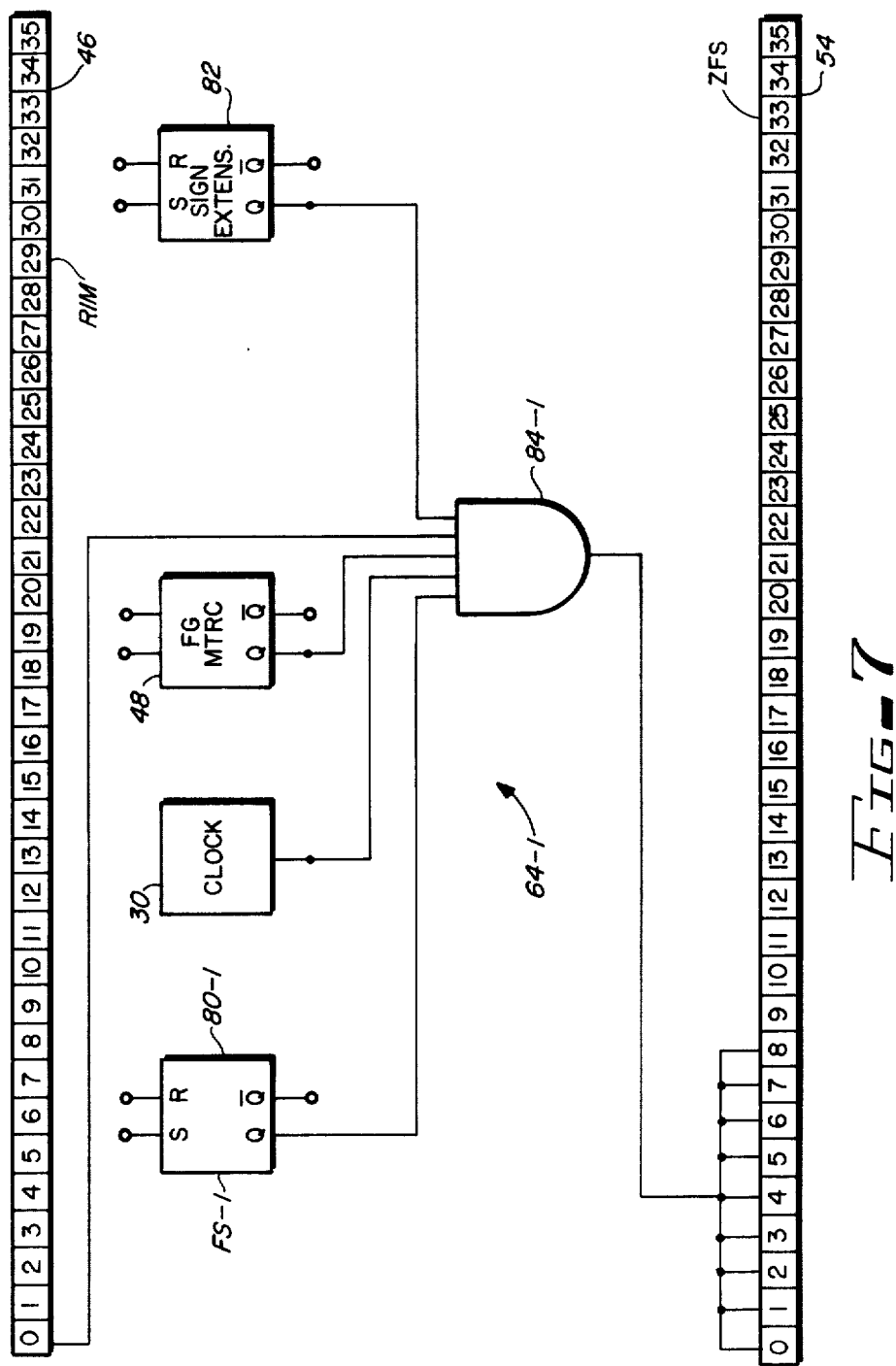

CIRCUIT FOR IMPLEMENTING A DIGITAL COMPUTER INSTRUCTION

CROSS-REFERENCE TO RELATED APPLICATION

This application is a continuation-in-part of application Ser. No. 328 filed Jan. 2, 1979 and which was subsequently abandoned after the filing date of this application.

BACKGROUND OF THE INVENTION

1. Field of the Invention

This invention is in the field of digital data processing systems and more particularly relates to a circuit for implementing an instruction for moving a binary number stored in a word addressable memory in a form which may be incompatible with the binary number being used in computations and for storing the binary number in an addressable register in a form compatible with its being used or operated on as a pure binary number.

2. Description of the Prior Art

Digital data processing systems are optimized to handle groups of a given number of bits, sometimes hereinafter referred to as data bits, in parallel, or as an entity, with a group of data bits being defined as a word, or a machine word. A word in turn can be defined as including a plurality of bytes with each byte containing a given number of data bits. There is no agreed to standard for the number of data bits to a byte. Some computer equipment manufacturers have standardized their equipment to use an 8 data bit byte and others to use a 9 data bit byte. In this application the word byte when used without a prefix or modifier will mean a 9 data bit byte.

Some data processing systems organize their memories, or working store, on the basis that each addressable memory location stores a machine word. Others are organized so that each addressable memory location will store a byte most commonly an 8 bit byte. Either type of computing system when required to operate on, or process, binary numbers will generally restrict or limit a binary number to a given number of characters where a character in an 8 bit byte machine will be 8 bits, an octet, and in a 9 bit byte machine will be 9 bits, a nonet. A word oriented data processing system having a word addressable memory with a word length of 36 bits is divisible into 4 bytes. To increase the ability of such a word oriented computer to compete with 8 bit byte oriented computers, it is desirable that such a word oriented computer be able to run application programs written to run on an 8 bit type character addressable memory computer. Such a word oriented computer should be able to handle binary numbers of one to four characters either octets or nonets. An advantage derived by a computer having this capability is that it saves users replacing a byte oriented computer with such a word oriented computer from having to rewrite their application programs. Such a conversion can be expensive and time consuming. However, to provide a word oriented computer with the capability of handling binary numbers having characters of either 8 or 9 bits per character requires that the computer have the ability to store a binary number in a word organized memory location with the most significant character of the binary number, the one that contains the most significant bit of the binary number, in any of the four byte positions of a given word location in memory with the remaining characters of the binary number being stored in adjacent byte positions in decreasing order of significance. Where 8 bit characters are stored in a 9 bit byte position, the most significant bit position of each byte will have a fill bit, normally a zero, stored in it. Depending upon the number of characters in a binary number and the byte location in which the most significant character is stored the less significant characters of the binary number may be stored in a contiguous word location in memory, or across a word boundary.

Given a binary number of from one to four characters with each character of a given number having either 8 or 9 bits per character and with the characters being stored in a word addressable memory with the most significant character in any one of the byte positions of the given memory location, the problem is how to efficiently move the binary number from its addressable memory location or locations to an addressable register in the central processor of the system with the binary number positioned in the register so that it is ready to be processed, or operated on; i.e., added, subtracted, multiplied, divided, etc. with the bits of the number right justified with the least significant bit of the number in the least significant bit position of the register and the more significant bits of the binary number stored in ascending order of significance from right to left. In addition with respect to some binary numbers it is also necessary to fill the higher order bit positions of the register not having stored into them a bit of the binary number either a fill bit or the sign bit of the number where the sign bit is the bit in the most significant bit position of the binary number. Heretofore, the manner in which this particular function has been performed has been by a software program. Such a program requires a significant number of instructions, each of which will require several clock periods to perform so that a significant amount of time is required to fetch from memory the binary number and position it in a designated register ready for subsequent processing. The penalty in performance, measured in terms of throughput of a data processing system which must make such transformations, obviously adversely affects the ability of such a data processing system to compete effectively particularly in performing such programs compared to a data processing system organized to directly address the characters of the binary number.

SUMMARY OF THE INVENTION

The present invention provides apparatus for implementing a single instruction for moving a binary number of from one to four characters where a character can consist of either 8 or 9 bits from a word addressable memory having four byte locations per word. Each byte location has 9 bit positions with the most significant character of the binary number being stored in any one of the four byte locations of the word. The instruction stores the binary number in a designated register with the binary number being right justified, i.e., with the least significant bit of the number stored in the least significant bit position of the register and the more significant bits of the number are stored in the register in order of increasing significance from right to left. Any higher order bit position of the register in which no bit of the binary number is stored will have stored into them a fill bit or the sign bit of the binary number.

In response to the receipt of an instruction, the control logic circuit means of the processor of the data processing system will fetch from memory the word or words in which are stored the characters of the binary number and will store the words in a double word data-in register. The instruction contains the following information: the address of the word in memory containing the most significant character of the binary number, the number of characters in the binary number, the byte position of the most significant character, whether the characters are octets or nonets, and whether the sign bit of the binary number shoud be extended. From this information the magnitude, the number of bits of the shift is determined to left justify, the data words stored in the data in register so that the byte containing the most significant character of the binary number will be left justified. The byte containing the most significant character and the remaining characters of the binary number in order of decreasing significance are stored in an intermediate register capable of storing one machine word. Knowing the number of characters of the binary number, the number of bits per character 8 or 9, the register into which the binary number is to be placed, and whether the sign bit of the binary number is to be extended, the contents of the intermediate register are applied to a multi-position gated format switch. The position of the switch which is gated on, or selected places the bits of the binary number from the intermediate register on the format switch output bus for storage in the designated addressable register with the bits of the binary number being right justified from right to left in order of increasing significance. Highest order bit positions will have stored into them the sign bit of the binary number if the instruction so provides or fill bits if it doesn't. The binary number in the designated register is in a form ready to be processed.

It is therefore an object of this invention to provide apparatus for implementing a single instruction for moving a binary number of from one to four characters of either 8 or 9 data bits per character stored in one or two word memory locations of a word addressable memory from memory and for storing them in a designated register with the binary number right justified ready for subsequent processing.

It is another object of this invention to provide apparatus for implementing a single instruction in a synchronous digital data processing system for moving a binary number of form one to four characters of either 8 or 9 bits per character stored in one or two word locations in a word addressable memory to an addressable register with the binary number being right justified ready for subsequent processing.

It is another object of this invention provide in a synchronous digital data processing system an instruction that replaces a software program for moving a binary number stored in memory to a register ready for subsequent processing in the minimum period of time.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 7 is a schematic block diagram of the sign extension circuit of the central processor of the data processing system of FIG. 1.

DETAILED DESCRIPTION OF THE INVENTION

Figure 1:
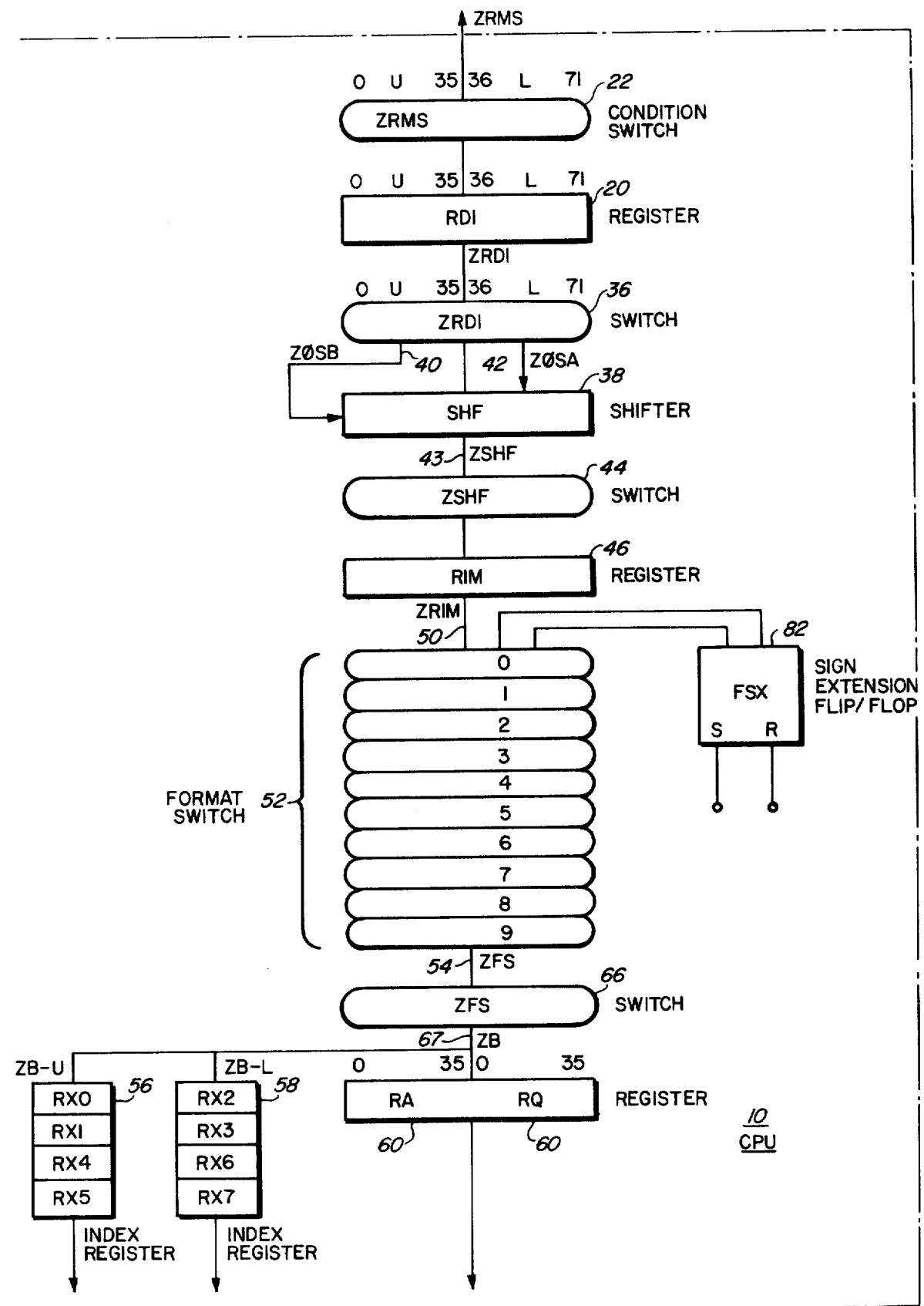
FIG. 1 is a schematic block diagram of a portion of a central processor of a data processing system illustrating the invention.
Figure 2:
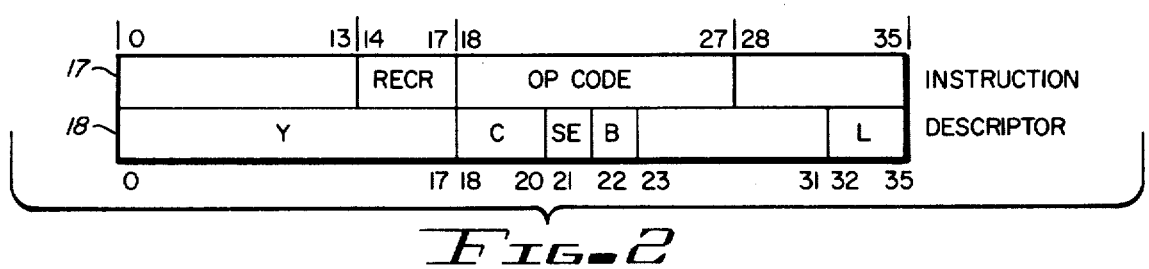
FIG. 2 is the format of an instruction.
Figure 3:
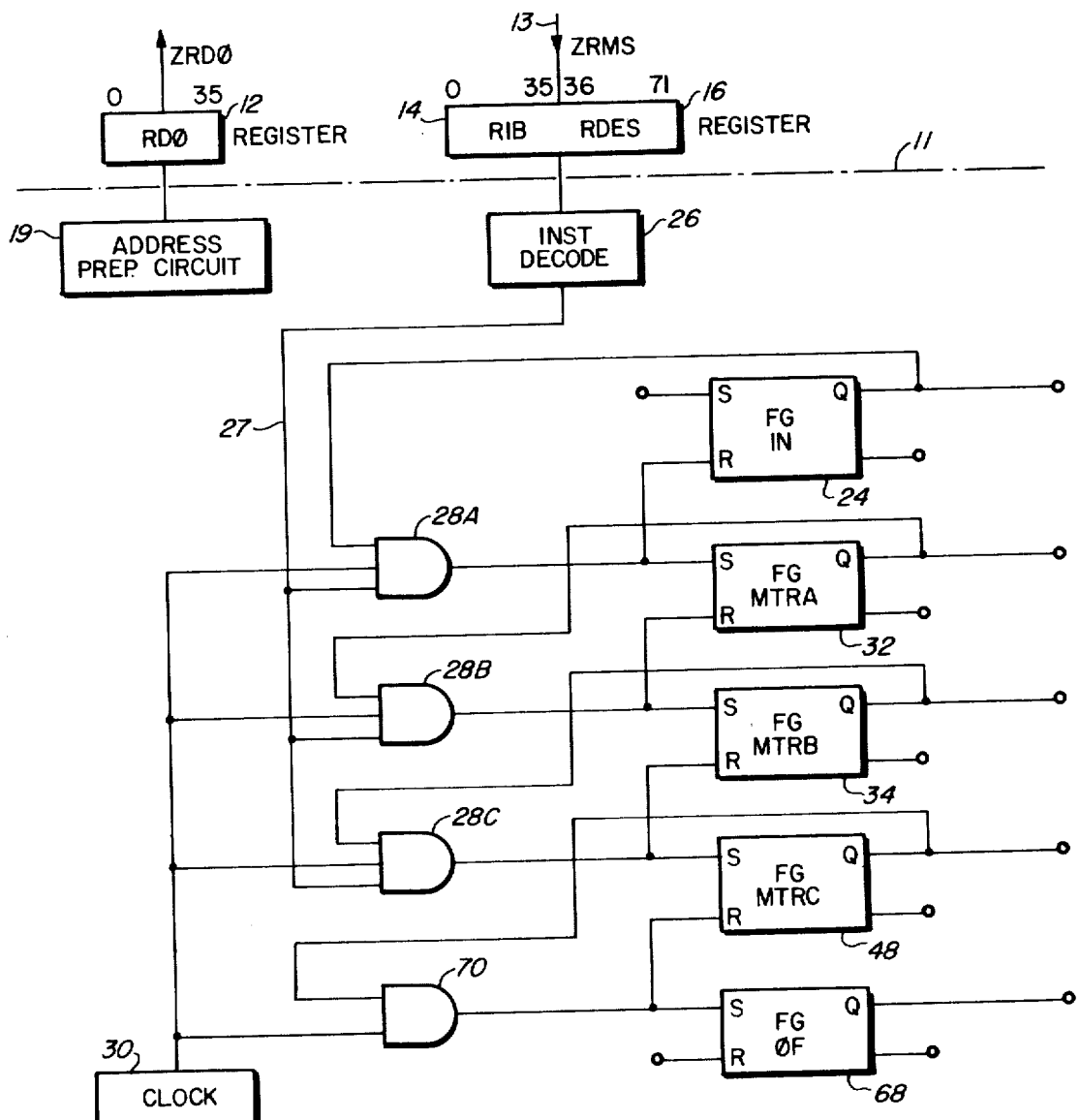
FIG. 3 is a schematic block diagram of a portion of the control logic circuit means of the central processor of FIG. 1.

In FIG. 1 only those elements of central processing unit (CPU) 10 that are utilized in the execution of the move to register (MTR) instruction are illustrated. CPU 10 is a subsystem of a data processing system such as that illustrated in U.S. Pat. No. 4,000,487 which issued on Dec. 28, 1976. The first step in moving a binary number from memory to a designated register is for the control logic circuit means 11 illustrated in FIG. 3 to issue a read command to the memory locations where the MTR instruction is stored through the data out register RDO 12. Since memory instruction preparation circuits including circuits to prepare the address of a word in memory are conventional and well known and form no part of this invention they are not illustrated. In response to such a read instruction being issued, the MTR instruction, a double word is transmitted from memory over the memory service bus ZRMS 13 and is stored in a two word register comprising an instruction buffer RIB 14 for storing an instruction word and descriptor register RDES 16 for storing a second word of the instruction which is also sometimes referred to as a descriptor. Each of registers 14, 16 is capable of storing a 36 bit machine word. The format of an instruction 17 and a descriptor 18 are illustrated in FIG. 2. The address field, Y, bit positions 0-17 of descriptor 18 stored in register 26 is the address in memory of the word in which the most significant character of the binary number to be moved to a designated addressable register is stored. Field C, bit positions 18-20 of descriptor 18 identifies or designates the byte position, or byte, if the word stored at memory location Y in which the most significant character of the binary number is stored. In the move to register instruction field C has four possible values since a 36 bit word is divisible, or can contain, four bytes. The number of characters making up the number is designated by field L bit positions 32-35 of descriptor 18. In the MTR instruction the maximum value of L is limited to 4.

The operational code field, bit positions 18-27 of instruction 17 designates the instruction to be performed. When field 18-27 of instruction 17 has the value which designates the instruction as being the MTR instruction, the address field Y of descriptor 18 is transferred to conventional address preparation circuit means 19 of the controller 11 and a memory read instruction is transmitted from data out register RDO 12 to the memory of the system. In response to such a memory command the memory will apply to the memory service bus ZRMS 13, the 36 bits of the word stored in memory at address, or location, Y as specified in descriptor 18. This word is stored into the upper half RDI-U of the double word data-in register RDI 20 by enabling switch position ZRMS-U 0–35 of a conventional multi position, or condition switch 22. The other positions of switch 22 are not illustrated since they are not used in implementing the MTR instruction. When the memory is ready to transmit over the memory service bus ZRMS 13 the word at memory location Y, the begin execution of instruction flip flop FGIN 24 of controller 11 illustrated in FIG. 3 will be set by signals from conventional sources indicating the presence of an instruction in registers 14, 16 and a word being stored in a memory service register in the memory subsystem of the computer system ready to be applied to the register service bus ZRMS 13. Circuits for detecting the presence of a word in a register are well known in the art and therefore are not illustrated herein to simplify the illustration and the description. When flip flop FGIN 24 is set, the upper half of switch 22, bit positions 0–35, will be enabled which causes the word on bus ZRMS 13 to be stored into the upper half RDI-U of the data-in register 20, bit positions 0–35. The operation code, bit positions 18–27, of the instruction word stored in instruction buffer 14 will have been applied to the instruction decoder 26 which will select conductor 27 by applying a logical 1 signal to it representing that the instruction MTR has been applied to and decoded by decoder 26. While a logical 1 signal is present on conductor 27, a logic 1 signal will be applied to one input terminal of three input terminal AND gates 28A–C. Clock signals from a conventional clock 30 are applied to a second input terminal of each of the AND gates 28A–C since processor 10 is a synchronous processor. When flip flop 24 is set, it will apply a logical 1 signal to the third input terminal of gate 28A. With flip flop 24 set and with a logical 1 signal on line 27 indicating the MTR instruction has been decoded, the next clock pulse or signal from clock 30 will cause a logical 1 signal to be applied to the set terminal of flip flop FGMTRA 32 which will cause it to set. When flip flop 32 is set, control circuit 11 will have sensed the byte position Field C of descriptor 18, of the word stored in memory location Y containing the most significant character of the binary number and the number of such characters comprising the number from Field L of descriptor 18. From this information, control circuit 11 determines if the binary number is stored across a word boundary, i.e., are one or more characters of the number stored into the next memory location having the adjacent address of (Y+1), for example. If the binary number is stored across a word boundary, then the address preparation circuit means 19 of controller 11 will issue another read instruction with the address of Y incremented by 1, or (Y+1). This word will be stored in the lower half RDI-L of RDI register 20, bit positions 36–71, by the lower half positions ZRMS-L, bit positions 36–71 of switch ZRMS 22 being enabled. On the next clock signal, flip flop FGMTRB 34 will be set by a pulse from AND gate 28B. The output pulse from gate 28B is applied to the reset terminal FGMTRA 32 which resets flip flop 32.

When flip flop 34 is set, it causes the words stored in data in register 20 to be applied through position ZRDI of switch 36 to conventional shifter 38. The word in the upper half RDI-U of register 20, bit positions 0–35 will be applied to shifter 38 through the B operand bus ZØSB 40 and the word, if any, stored in the lower half RDI-L of register 20, bit positions 36–71 will be applied over A operand bus ZØSA 42 to shifter 38. Knowing from Field C of descriptor 18 the byte positions of the word stored in the upper half RDI-U of register 20 in which the most significant character of the binary number is stored, and knowing that the number of bits per byte position is 9, control circuit 11 determines the magnitude of the shift that must be applied to the words stored in data-in register RDI 20 to left justify the bytes containing the characters of the binary number so that the most significant character occupies the highest order byte position on shifter output bus ZSHF 43. Bus ZSHF 43 is a one word bus, i.e., it has 36 conductors, for carrying or transmitting 36 bits of information in parallel. The amount of shift applied to the signals applied to shifter 38 is equal to 9 (C-1). For example, if the most significant character of the binary number is stored in the second byte position, then to left justify the bytes in which the characters of the binary number are present, it is necessary to shift the contents of register RDI 20 by 9 bit positions to the left. Signals representing the necessary amount, or magnitude, of the shift are applied to shifter 38 from the control circuit 11 over conductors which are not illustrated since they are conventional and well known in the art and would tend to make the illustration of the invention more complex and difficult to understand. The words applied to shifter 38 over ZØSB and ZØSA buses are shifted to the left so that the byte containing the most significant character of the binary number is left justified. Up to four bytes containing characters of the number, which bytes are arranged in decreasing order of significance from left to right are applied to the shift output bus ZSHF 43 and through switch position ZSHF of gated select switch 44 are applied to intermediate register RIM 46. Register RIM 46 is enabled to store them by control signals from controller 11.

When the next clock pulse is produced by clock 30, AND gate 28C will be enabled which will set flip flop FGMTRC 48 and reset FGMTRB 34. When flip flop FGMTRC 48 is set, the word stored in intermediate register RIM 46 will be applied to the intermediate register bus ZRIM 50 which is connected to format switch 52. Format switch 52 is a one of ten gated select switch which will change the format of the signals of the machine word applied to it from bus ZRIM 50 in such a manner as to right justify the binary number contained therein on shifter output bus ZFS 54.

The formats designated RIM-0, FIG. 5A, and RIM-1, FIG. 5F, are the two formats of a biary number on bus ZRIM 50. In FIGS. 5B–E and 5G–L the formats produced by each of the ten positions FS 0–9 are illustrated. The position of switch 52 enabled is determined from the information in the instruction words stored in registers 14, 16 of controller 11. The type of character C, whether it's an 8 bit or a 9 bit character is identified by Field B, bit position 22 of descriptor 18 and the number of characters comprising the binary number is specified by Field L, bit positions 32–35 of descriptor 18. The sign extended field SE, bit position 21 of descriptor 18 determines whether the sign bit, the most significant bit of the binary number is to be used to fill any higher order bit positions on bus ZFS 54 not needed or used to transmit the number. This information is used by control circuit 11 to select which switch position FS 0-9 is to be enabled. In addition the addressable register to which the binary number, the signals on format switch output bus 54 is to be stored is specified in Field RECR, bit positions 14-17 of instruction 17. Eight of the ten directly addressable, or program addressable, registers of the central processing unit 10 in the preferred embodiment are index registers RX 0-7 which are half word registers,; i.e., capable of storing only 18 bits or a half word. The other addressable registers are the A register RA 60 and the Q register RQ 62 each a full word register. A further restriction is that if the binary number is to be stored in registers RX 0, 1, 4, or 5 of register bank 56, then the binary number can have at most two characters C and these two characters must be placed on the conductors of the upper half ZFS-U of bus ZFS 54 bit positions 0-17. If the one or two characters of the binary number are to be stored in index registers RX 2, 3, 6, and 7, the characters have to be placed on the lower half ZFS-L of bus ZFS 54, bit positions 18-35. Thus, the register into which the binary number is to be placed, the number of characters in the number, and whether the characters are 8 to 9 bit characters determine which switch position of format switch 52 is to be enabled.

As the binary numbers are applied to the format switch output bus 54 by the format switch 52, they are right justified to a word or half word boundary with the bits of the binary number in order and contiguous and with the least significant data bit in the least significant data bit position whether the binary number is made up of 1, 2, 3, or 4 characters. If the sign extension field SE is a logical one, then a sign extension circuit 64 of control logic circuit 11, one part of which is illustrated in FIG. 7 will provide a logical one in the higher bit positions of bus ZFS 54, if the bit positions are not used to store bits of the binary number and if the most significant bit of the binary number is a 1. The sign extension circuit 64 will apply a 0 to these positions if the most significant bit of the binary number is a 0. If the sign extension bit is a 0 then the sign extension circuit will provide a 0 or a fill bit in any higher order bit position of bus 54 not needed for applying the bits of a binary number to the register. The signals on the format switch outut bus 54 are applied through switch 66 and bus ZB-67 to registers RX 0-7, RA, and RQ. The register designated by the field RECR of instruction 17 will be enabled by control signals from controller 11 to store the bits on the conductors of bus ZB 67. The binary number stored in registers RX 0-8, RA and RQ will be inthe proper format so that it can be applied to the binary arithmetic unit of CPU 10 for example. When the next clock pulse is produced by clock 30, finish of instruction flip flop FGØF 68 will be set by the clock pulse from clock 30 enabling AND gate 70 which resets FGMTRC 48 and the setting of FGØF signals the completion of the instruction. Control logic circuit means 11 is then ready to implement the next instruction to be stored in instruction registers 14, 16.

Figure 4:
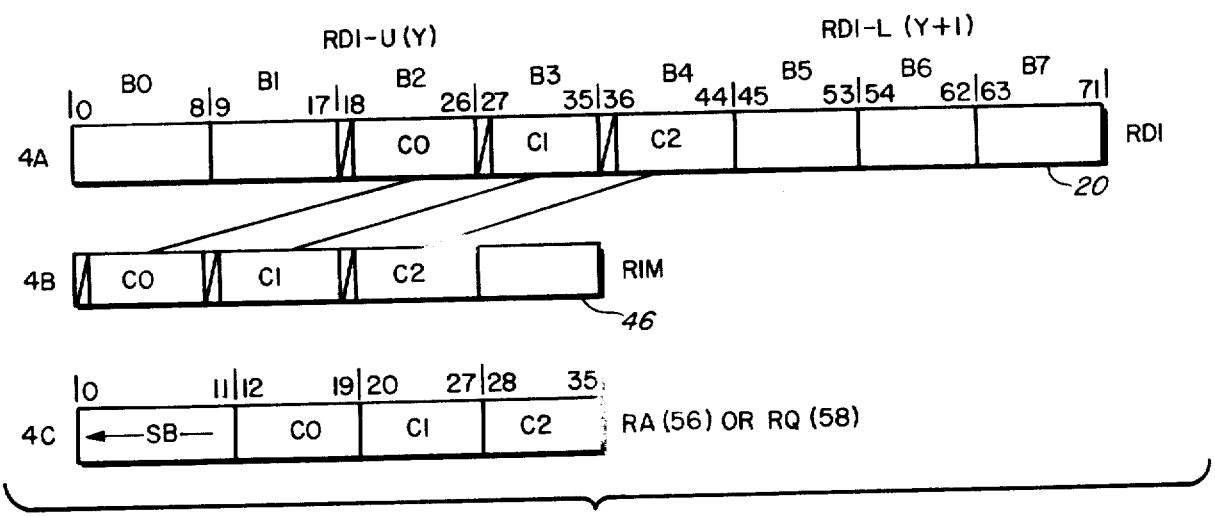
FIGS. 4A-C illustrate an example of the charges in format of a binary number as it is moved to an addressable register.

In FIG. 4 an example of the transformations that occur to words stored in two memory locations Y and Y+1 in implementing the move to register instruction until the binary number which was stored in these two locations in memory is stored in an addressable register RA or RQ or RX 0-7 is illustrated. For the purposes of this explanation, it is assumed that a binary number having three characters C0, C1, and C2 and that its most significant character C0 is stored in byte location B2, bit positions 18 through 26. Since the number of characters C comprising the number is 3, in the example, the binary number extends across a word boundary between words which had been stored at locations Y and Y+1. The 36 bit word from memory location Y will be stored in the upper half RDI-U of data in register RDI 20, bit positions 0-35, and the word from memory location Y+1 will be stored in the lower half RDI-L of register RDI 20, bit positions 36-71, as seen in FIG. 4A. The characters of the binary numbers in this example have 8 bits, or are octets, and are designated by C. A 9 bit character will be designated by C'. The first step in implementing the move to register instruction, left justifies the bytes containing characters of the binary number so that the bytes are left justified when stored into intermediate register RIM 46, FIG. 4B. Field C of descriptor 18 illustrated in FIG. 2 designates the byte positions of the word stored at location Y which contains the most significant character C0. The number of bit positions that the contents of data in register RDI 20 must be shifted to the left is equal to 9 (C-1), or 18 bits in this example, so that if the contents of register 20 are shifted to the left 18 bit positions, byte B2 containing the most significant character C0 will be left justified when stored in register RIM 46 as seen in FIG. 4B. Up to this point in implementing the instructions, no distinction is made whether the characters of the binary number are octets or nonets.

Figure 5:
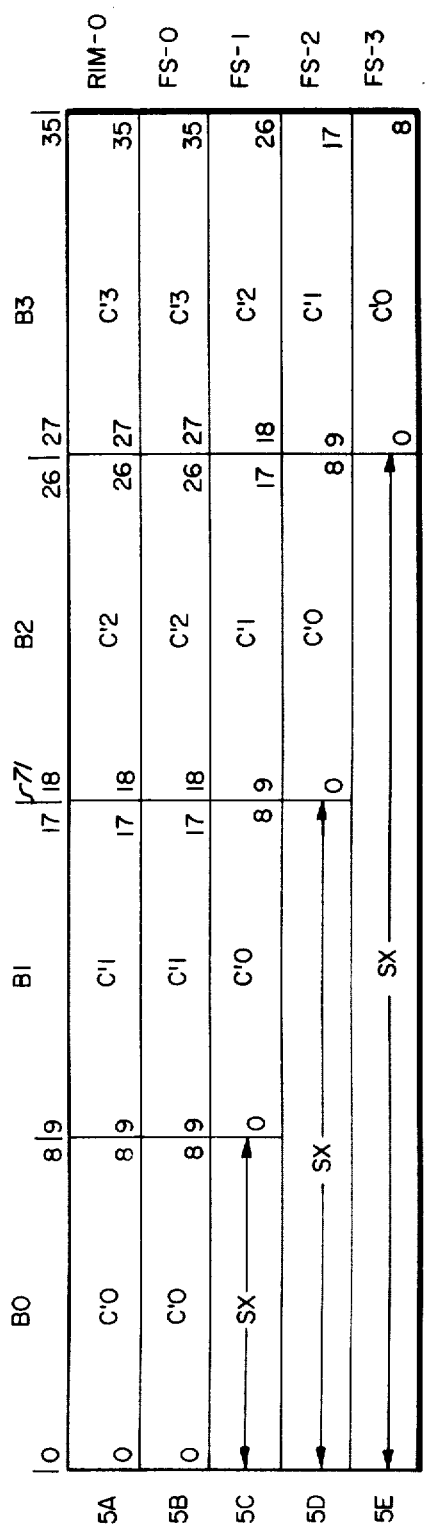
FIGS. 5A-L illustrate the formats of words including characters of a binary number as applied to a format switch and the format of the binary number on the format switch output bus for each position of the format switch.
Figure 5:
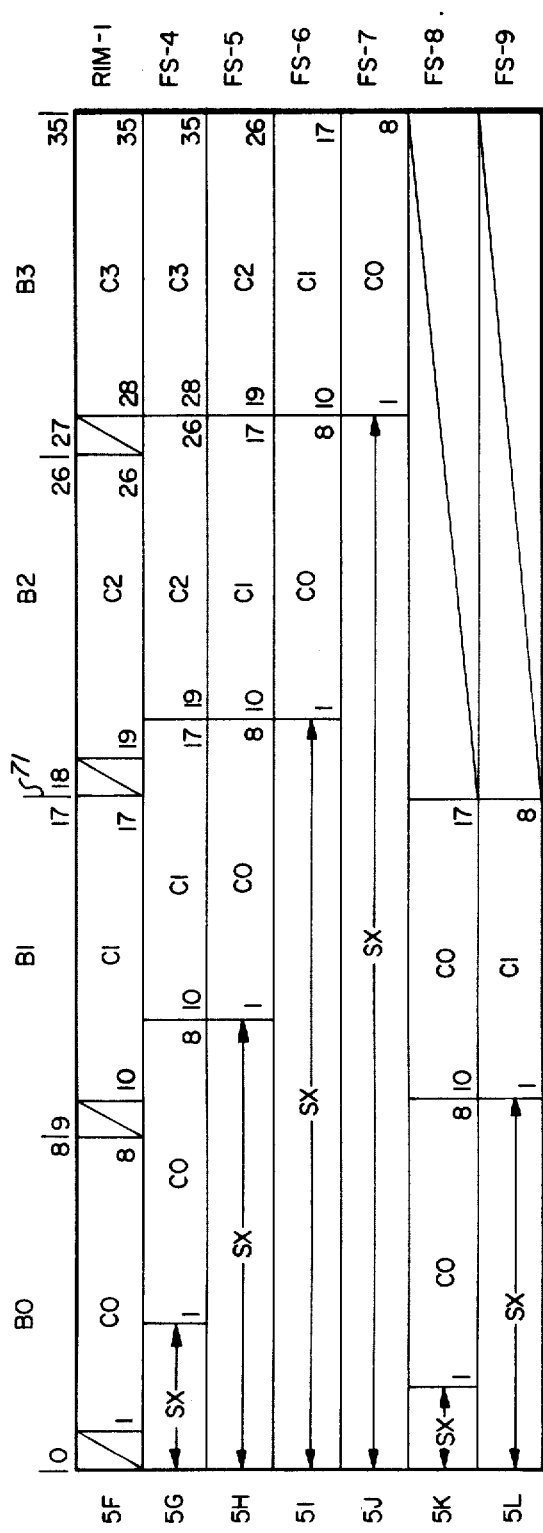

Knowing that the characters C of the binary number are octets which is designated by the field B bit position 22 of descriptor 18, the number of characters designated by field L and the register into which the binary number is to be stored which is designated by bit positions 14-17 of instruction 17, controller 17, controller 11 selects the 1 of 10 gated select format switch 52 position which when enabled or selected will cause the three characters C0, C1, and C2 of the binary number to be right justified on format switch output ZFS 54. Referring to FIG. 5, it is seen that this would be switch positions FS-5 in the example illustrated in FIGS. 4A-4C. With switch position FS-5 being enabled by control signals from controller 11, the fill data bits in bit positions 0, 9 and 18 of the word stored in register RIM will be eliminated, i.e., not connected to output bus ZFS 54 and the character C2 will be positioned so that when stored in register RA for example, the least significant data bit of character C2, data bit 26, will be right justified, i.e., will be in data bit position 35 with the remaining data bits of the characters C0, C1, C2 being arranged in order of increasing significance from right to left as illustrated in FIG. 5H. If the sign extension bit Field SE, bit position 21 of the descriptor 18 is a logical 1 then the balance of the more significant bit positions SX on bus ZFS 54, bit positions 0 through 11 in this example, will have the same binary value as that of the most significant bit of the binary number; namely the bit in bit position 12. If the sign extension bit is a zero then the sign extension bits 0 through 11 will have stored into them fill bits, logical zeroes.

The MTR instruction identifies the register into which the right justified binary signal is to be stored and controller 11 provides the necessary signals to enable the addressed register to store the signals applied to it over bus ZB 67 as is well known. Registers RX 0, 1, 4, and 5 are connected to bus ZB-U so that the conductors of the more significant bits on bus ZB 67, bit positions 0-18 can be stored into them. The lower half, ZB-L, the less significant bit positions of bus ZB-67, i.e., bit positions 18 through 35 are storable into registers RX 2, 3, 6, or 7. In the example illustrated in FIG. 4, the binary number has three characters, C0, C1, C2 so that the binary number can only be stored into either of the full word registers RA, RQ. When a binary number is stored into the addressed register, the binary number is right justified to either a full word or a half word boundary with either a fill bit or the sign bit being stored into unused higher order bit positions of the addressed register depending upon the value of the sign extension bit in descriptor 18. The binary number when stored in the register designated by the instruction word 17 is ready to be operated on by subsequent instructions.

The need for the sign extension bit occurs because the binary arithmetic units of processor 10 are designed to handle 36 bits in parallel. To avoid changing the internal structure of the processor, particularly such units as the binary arithmetic unit when required to operate on binary numbers of less than 36 bits, and particularly if the binary numbers in the signed twos complement notation the use of sign extension bits is necessary to avoid the introduction of possible computational errors as is well known.

The format of a 36 bit word identified as RIM-0 which is typical of the format of a word stored in the intermediate register RIM 46 when the binary number is composed of 9 bit characters is illustrated in FIG. 5A. When stored into register RIM 46, the binary number is left justified so that the characters C'0, C'1, C'2, and C'3 will be positioned as illustrated in FIG. 5A. It should be noted that there are no fill bits present when the characters of the binary number are nonets. When the format switch 52 is placed in its 0 condition, FS-0, the contents of the intermediate register 46 are applied to the format switch output bus ZFS 54 without change. If the number of characters C' of the binary numbers stored in Register RIM, 46 is 3, and the characters are nonet, control circuit 11 will set flip flop FS-1, 80-1, in FIG. 7 by conventional circuit means which are not illustrated. The Q output of flip flop 80-1 will be applied to format switch FS52 by conventional circuit means which are not illustrated, to enable, or select, position FS-1 of format switch 52 with the result that only the three most significant characters C'0, C'1 and C'2 will be applied to bus ZFS 54 and be stored into a designated registers RA or RQ. If the sign extended bit of descriptor 18 is a 1, sign extension flip flop 82 is set, and bit position 0-8 of the format of FIG. 5C will be the same or have the same value as the binary signal stored in bit position 0 of intermediate register RIM 46 which is the same as the signal which is in bit position 9 on bus ZFS 54.

Sign extension circuit 64 of control logic circuit 11 has nine separate but similar circuits to circuit 64-1 illustrated in FIG. 7. There is one such sign extension circuit for each of the switch positions FS1-FS9. In FIG. 7 sign extension circuit 64-1 for format switch position 1 is illustrated. The function of sign extension circuit 64-1 when sign extension flip flop 82 is set by the bit in bit position 21 of descriptor 18 is to extend the most significant bit of the binary number applied to format switch 52 from intermediate register RIM46 onto bus ZRIM 50 so that the higher order bit positions of the binary word on bus ZFS will have that value. Circuit 64-1 consists of five input AND gate 84-1 and when necessary because of fan out limitations of AND gate 84-1, amplifier drivers which are not illustrated in FIG. 7. In operation circuit 64-1 will load into bit position 0-8 of bus ZFS 54 bits of the same value as that stored in bit position 0 of intermediate register RIM 46 when flip flop FS-1, 80-1, flip flop FGMTRC 48 and sign extension flip flop 82 are set and clock 30 produces a positive timing pulse.

Sign extension circuits 64 for each switch position address 2-9 are not illustrated since they have the same basic components as 64-1, differing only with respect to which bit position of register 46 is connected to the five input AND gate and which switch control flip flop 80 is connected to the AND gate of that sign extension circuit. The formats illustrated in FIG. 5 show the bit positions which are controlled by the sign extension circuit 64 and the information set forth above indicates which is the most significant bit position of the number to be applied to the AND gate 84 for each given switch position FS-1,9. For this reason it is believed not necessary to repeat the details of each of the sign extension circuits.

If the binary numbers stored in register RIM have only two characters C'0, and C'1, then format switch 42 will be put in its condition designated as FS-2 illustrated in FIG. 5D which causes the two characters C'0 and C'1 to be right justified. If the sign extension bit is a 1 bit positions 0 through 17 will have the same value as bit position 18.

If only the first, or most significant, 9 bit character C'0 is to be used and stored in a designated register, then switch position FS3 will be enabled and the format of the signals on Bus ZFS 54 will be as illustrated in FIG. 5E. If the sign extension bit is a 1, then bit positions 0-26 will have the same value as that of the bit in position 27.

If the binary number consists of not more than two characters and if the characters are to be stored in a register of index register bank 56 RX 0, 1, 4, and 5, switch position FS-0 will be enabled which causes the first two characters C'0 and C'1 to be in the upper half of the word, bit positions 0-18. If only one character is to be stored in one of these four registers, switch position FS-1 will be enabled. If the characters are to be stored in the lower half bank of index registers 58, RX 2, 3, 6, and 7, then the switch position to be enabled or selected will be FS-2 if the binary number has two characters to the number, and FS-3 if the binary number has but one.

The format designated RIM-1 in FIG. 5F illustrates the arrangement of characters C which are octets as they exist in intermediate register RIM 46 or as they are applied to bus ZRIM 50 after being left justified so that the most significant character C 0 will be in the most significant byte position B0. Since the characters are octets, a fill bit designated by a diagonal line slanting upwardly from left to right will be stored in the most significant bit position of each byte storing a character, i.e., bit positions 0, 9, 18 and 27 of FIG. 5F. If the binary number consists of four octets C0, C1, C2, and C3, then format switch 52 will be put into its position, or condition, designated as FS-4 which will cause the four octets C0, C1, C2, and C3 to be right justified with the least significant bit, bit 35 of the number in bit position 35 and the most significant bit of the number being in bit position 4 when the binary number is placed in on bus ZFS 54. Fill bits present in register RIM 46 will be eliminated so that the bits of the binary number are arranged in order of increasing significance from right to left as illustrated in FIG. 5G. If the sign extension bit is present, then bit positions 0-3 will have the same value as bit position 4. If the binary number consists of three octets C0, C1, and C2, then switch 52 will be placed in its condition FS-5 which will cause the binary number to be right justified with the least significant bit 26 of the binary number in bit position 35 and the most significant bit of the most significant character C0, bit 1, in bit position 12 as seen in FIG. 5H. If the sign extension bit is a 1, then bit positions 0 through 11 will have the same value as the bits stored in bit location 12. If the binary number consists of two octets C0 and C1 then switch 52 will be placed in its condition corresponding to FS-6, illustrated in FIG. 5I and the two characters C0, C1 will occupy bit positions 20-35. If the sign extension bit is a 1, bit positions 0 through 19 will be the same as that of the bit stored in bit location 20. If the binary number is a single character octet C0, switch 52 will be placed in its condition FS-7, see FIG. 5J, and the format of the signals on bus ZFS 54 will be as illustrated in FIG. 5J. If the sign extension bit is a 1, bit positions 0-27 will have the same value as that of the bit in position 28.

As pointed out above if one wants to store a half word into the bank of registers 56, the bits of the half word must be placed on the conductors, numbered 0 through 17, of bus ZFS-54 and switch position FS-8 will be enabled which puts the two characters C0, C1 in the upper half of a word ready for storage in whichever one of registers RX 0, 1, 6, or 7 is enabled pursuant to the designation of the addressable register in field RECR of instruction 17. If the sign extension bit is a 1 or is present, and switch 52 is in condition FS-8, bit positions 0 and 1 will have the same value as the bit stored in bit position 2. If switch 52 is in condition FS-9, only a single octet C0 will be present and right justified against the half word boundary 71 between bit positions 17 and 18. If the sign extension bit is a 1 the bit stored in bit locations 0 through 9 will be same as that stored in bit position 10 as illustrated in FIG. 5L.

Figure 6:
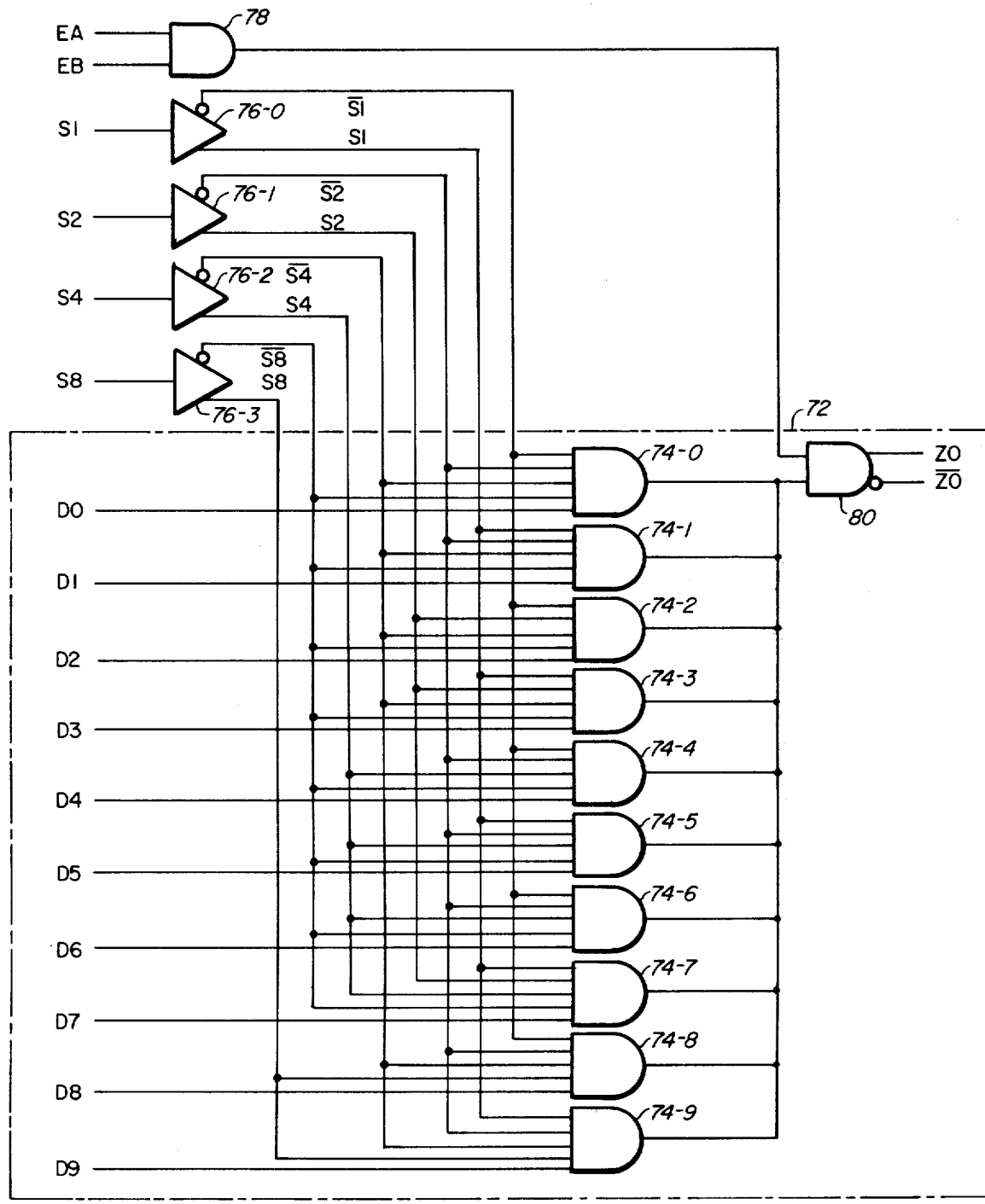
FIG. 6 is a schematic block diagram of a switching unit of a one of ten gated select format switch 52 of FIG. 1.

FIG. 6 is a block diagram of a 1 of 10 gated select switching unit 72 of format switch 42 that selects which one of ten logic signals applied to the input terminals D 0-9 will be connected to and appear at switching units 72 output terminal Z0. Terminal Z0 is then connected to one conductor of switch output bus 54, the most significant bit position, bit position 0 for example. Since a machine word in the preferred embodiment has 36 bits, switch 52 had 36 of switching units 72. Each unit 72 is provided with ten five input AND gates 74 0-9. Which one of AND gates 74 0-9 will be enabled is determined by gate select control signals S1, S2, S4 and S8 from the source of control signals 11. The signals S1, S2, S4 and S8 are applied respectively to conventional amplifiers or buffer circuits 76 0-3. Amplifiers 76 0-3 produce as their output signals control signals S1, S2, S4, and S8 and $\overline{S1}, \overline{S2}, \overline{S4}$ and $\overline{S8}$. control signals S1, S2, S4 and S8 and their complements $\overline{S1}, \overline{S2}, \overline{S4}$ and $\overline{S8}$ are applied to four of the input terminals of each of the five input AND gates 74 0-9 so that only one of the gates 74 0-9 can be selected or enabled at any one time. Which one of the AND gates 74 0-9 is enabled is determined by the binary values of S1, S2, S4 and S8 at any given moment. The other input terminals of each of AND gates 74 0-9 are connected, respectively, to one of input terminals D 0-9 to which input terminals are applied logic signals or bits on bus ZRIM 50 or signals from the sign extension circuit 64. In addition to the gate select control signals S1, S2, S4 and S8 applied to the amplifier circuits 76 0-3; enable logic signals EA and EB are applied to enable AND gate 78, the output signal of enable gate 78 is applied to an input terminal of output AND gate 80.

Gates 78 and 80 are, in the preferred embodiment, two input terminal AND gates. Gate 80 produces as its output the signal Z0 and its inverted or complemented output $\overline{Z0}$. Depending upon the values of S1, S2, S4, and S8 and if the enable signals EA and EB are present, then the signal applied to the selected one of the input terminals D 0-9 of unit 72 will be present or appear at output terminal Z0 and thus in bit position 0, the most significant bit position of format switch output bus ZFS54.

In FIGS. 5A-F the bits of a machine word are identified. The bit positions of the characters of the binary numbers on bus ZRIM 50 for each position of format switch 52 are located within the output formats, FIGS. 5 B-E and 5 G-L. The sign extension bits SX will be connected to the appropriate sign extension circuit 64 only circuit 64-1 for position FS-1 is illustrated in FIG. 7. It is believed well within the capabilities of those skilled in the art based on the information provided that one can connect the input terminals D 0-9 of the circuit switching units 72 to the appropriate conductors of the intermediate bus ZRIM 50 and to the sign extension circuit 64 to produce the formats on the binary numbers of output bus ZFS 54 for each of the ten conditions or positions of switch 52 as illustrated in FIGS. 5A-5L.

From the foregoing it is believed obvious that this invention provides hardware for implementing an instruction that will quickly and reliably move a binary number of from 1 to 4 characters, where a character can have either 8 or 9 bits, and in which the most significant character of the number can be stored in any byte position of a word to an addressable register. The binary number will be moved to a designated addressable register with the binary number being right justified and arranged in order with the least significant bit in the least significant bit position of the register and remaining bits in the binary number arranged in order of increasing significance from right to left. The sign bit of the binary number can be extended to fill the higher order bit positions in the register if the sign extension bit of the descriptor is set.

While the principles of the invention have now been made clear in an illustrated preferred embodiment, there will be many obvious modifications of the circuits of these components which can be made without departing from these principles. The appending claims are intended to cover such modifications.

What is claimed is:

1. In a central processor of a digital data processing system, circuit means for reformatting a pure binary number comprising:

a data-in register adapted to have stored into it a first and a second word, with each word having 36 data bits, with the bits of each word being divided into 4 bytes of 9 data bits per byte, with each of the 4 bytes adapted to contain a character of the binary number, and with each character having 8 or 9 data bits; the number of characters of the binary number being in the range of from 1 to 4; the first word stored in the data-in register containing the most significant character of the binary number, which most significant character is stored in an identified one of the four byte positions of said first word; any other characters of the binary number being stored in contiguous byte locations of decreasing significance;

an intermediate register for storing 36 data bits;

shifting means connected to the data-in register and the intermediate register for shifting the words stored in the data-in register so that the byte of the first word containing the most significant character of the binary number is left justified;

means for storing the byte containing the most significant character and any other bytes containing characters of the binary number in the intermediate register, the byte containing the characters of the binary number being arranged contiguously in order of decreasing significance from left to right;

an addressable register of the central processor; and format switch means connected to the intermediate register and the addressable register for reformatting the 36 data bits stored in the intermediate register so that the data bits of the binary number are right justified and contiguous; and means for storing the binary number as reformated by the format switch means in the addressable register.

2. The circuit means of claim 1 which further includes means for providing sign extension bits to fill higher order data bit positions of the addressable register not used to store data bits of the binary number.

3. In a central processor of a data processing system the combination comprising:

a data-in register adapted to store a first and a second data word with each data word having 36 data bits, each data word being divided into 4 bytes with each byte having 9 data bits per byte; the data words stored in the data-in register containing a binary number of from 1 to 4 characters with each character of the binary number having either 8 or 9 data bits per character, and with the most significant character of the number being stored in one of the four bytes of the first data word;

a source of control signals;

a shifter;

circuit means for applying the data bits stored in the data-in register to the shifter, said shifter in response to control signals applied to it from the source of control signals producing a shifter output word by shifting the bytes containing characters of the binary number so that the character containing the most significant data bits of the binary number is positioned in the highest order byte of the shifter output word;

circuit means for storing the shifter output word in an intermediate register;

a format switch having a plurality of positions and a format switch output bus;

circuit means for applying the shifter output word stored in the intermediate register to the format switch, said format switch in response to control signals from the source of control signals changing the format of the binary signals of said shifter output word into a format switch output word on the format switch output bus, the data bits of the binary number in said format switch output word being right justified with the least significant data bit of the binary number in the least significant bit position of the format switch output word and with the data bits of the binary number of the format switch output word being contiguous and in order of increasing significance;

a plurality of addressable register means of the central processor for storing the format switch output word on the format switch output bus, said plurality of addressable register means being adapted to store the format switch output word;

one of the addressable register means, responsive to a control signal from the source of control signals applied to it storing the format switch output word; and a sign entension circuit responsive to control signals from the source of control signals for causing the sign data bit of the binary number to be present in higher order data bit positions of the format switch output word not used for data bits of the binary number.

4. In the central processor of a data processing system the combination comprising:

a source of control signals;

a data-in register adapted to store binary data signals of a first and second data word, each data word containing 36 data bits with the data bits of each data word being divided into four bytes, of nine bits per byte;

said data-in register storing a first and second data word containing a binary number of from one to four characters, at least one character of the binary number being positioned in one of the four byte locations of the first data word and any remaining characters of the binary number being stored in contiguous byte positions in order of decreasing significance from left to right in the data words in the data-in register;

an intermediate register;

a shifter circuit connected to the data-in register, said shifter circuit being responsive to control signals from the source of control signals for shifting the bytes containing characters of the binary number stored in said data-in register so that the byte containing the most significant character of the binary number is left justified with any other bytes containing characters of the binary number being arranged in descending order of significance from left to right;

circuit means for storing the output of the shifter circuit in the intermediate register;

addressable register means in the central processor for storing the data bits of the binary number;

a format switch connected to the intermediate register and responsive to control signals from the source of control signals for changing the format of the data word stored in the intermediate register so that the data bits of the binary number are right justified and contiguous; and circuit means for storing the binary number in one of the addressable register means with the data bits of the binary number being contiguous and in order of increasing significance from right to left.

5. The combination of claim 4 further including sign extension circuit means which are connected to the format switch and which when enabled by a control signal from the source of control signals will apply the sign data bit of the binary number to higher order data bit positions for storage in the addressable register means which are not used to store data bits of the binary number.

* * * * *